United States Patent [19]

Gray

[11] Patent Number: 5,228,795
[45] Date of Patent: Jul. 20, 1993

[54] SELF-TIGHTENING FITTING FOR ATTACHMENT OF METAL TO CARBON-CARBON STRUCTURES

[75] Inventor: Paul E. Gray, North East, Md.

[73] Assignee: Rohr, Inc., Chula Vista, Calif.

[21] Appl. No.: 457,390

[22] Filed: Dec. 27, 1989

[51] Int. Cl.$^5$ .............................. F16B 1/00; F16C 9/00
[52] U.S. Cl. ...................................... 403/30; 403/404; 403/408.1; 411/546
[58] Field of Search ................... 403/28, 29, 30, 408.1, 403/404; 411/546

[56] References Cited

U.S. PATENT DOCUMENTS 4,512,699 4/1985 Jackson et al. .................... 403/28 X
4,834,569 5/1989 Foote et al. .................. 403/408.1 X

*Primary Examiner*—Harold J. Tudor
*Attorney, Agent, or Firm*—P. J. Schlesinger; F. D. Gilliam

[57] ABSTRACT

An attachment fitting for securing metal structures to carbon-carbon structures which tightens as temperature increases. The fitting is particularly useful in high temperature aerospace applications such as hypersonic aircraft. The fitting basically connects an upstanding carbon-carbon blade on a carbon-carbon structure to a metal clevis which fits snugly thereover. A ceramic bushing is fitted in a transverse hole in the blade. A transverse bolt hole extends through the clevis and bushing. A bolt in the bolt hole is tightened with one or more nuts to tightly press the clevis against the busing and blade. The bolt and nut material is selected to have a lower coefficient of thermal expansion than the clevis so that differential thermal expansion between clevis and bolt keeps the joint tight at elevated temperatures.

6 Claims, 1 Drawing Sheet

SELF-TIGHTENING FITTING FOR ATTACHMENT OF METAL TO CARBON-CARBON STRUCTURES

BACKGROUND OF THE INVENTION

This invention relates in general to fittings for connecting structures together and, more specifically, to a self-tightening fitting for connecting metal and carbon-carbon structures.

High temperature and high vibration levels are encountered in many aerospace applications, both in spacecraft and in hypersonic aircraft. A variety of different structural materials are required for this structure to provide high strength, resistance to very high temperatures together with light weight. Various metal alloys and composite materials are being considered for use in such applications.

Carbon-carbon composites are being considered as a structural material designed to operate in a hot sonic environment. Examples of these structures included afterburning vectoring nozzles for future military aircraft and hot structures found on transatmospheric hypersonic aircraft. In these applications, the carbon-carbon materials will encounter sound pressure levels as high as 180 dB and temperatures well over 1000° C.

The carbon-carbon materials must be securely fastened to underlying vehicle structure, which is generally formed from metals having coefficients of thermal expansion (CTE) much higher than carbon-carbon. Many fittings fail when subjected to the vibration levels and thermal cycling encountered in these applications. Also, since the carbon-carbon materials are subject to wear or erosion in many of these applications, vehicle designers must provide for quick and convenient removal and replacement of the carbon-carbon structure at the fittings.

Thus there is a continuing need for metal to carbon-carbon structure fittings capable of remaining tight under these severe conditions while permitting easy removal when necessary.

SUMMARY OF THE INVENTION

The above-noted problems, and others, are overcome in accordance with this invention by a fitting which basically comprises a carbon-carbon blade extending from a carbon-carbon structure which is surrounded by and secured to a metal clevis extending from a metal structure.

Carbon-carbon materials are ordinarily prepared by embedding high strength carbon fibers, often in the form of fabrics or mats, in a synthetic resin, such as phenolic resin. A structure is formed from the material. Then the structure is heated to the carbonization temperature of the resin in the absence of oxygen for a period sufficient to drive off all elements except carbon, leaving a unitary structure of carbon fibers in a carbon matrix. These structure have very low CTE's, high strength, and are weight efficient at high temperatures.

A ceramic bushing occupies a transverse hole in said blade and has surfaces coplanar with the blade. The bushing may be formed from any suitable ceramic material having high strength and a low CTE, preferably close to that of the carbon-carbon material. Typical ceramic materials include silicon carbide, and silicon nitride.

The blade and clevis are secured together by a bolt extending through a transverse hole through the clevis and bushing. The bolt may have a conventional head on one end and a nut on the other, or may be a headless bolt or a threaded rod with nuts on both ends. Conventional bolt and nut locking mechanisms such as a bendable clip may be used to prevent loosening in a high vibration environment.

The bolt and nut may be formed from any suitable metal having a CTE higher than that of the clevis material. Excellent results are obtained where the clevis is formed from a ferrous, nickel or cobalt based alloy and the bolt and nut(s) are formed from a niobium alloy having a lower CTE.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
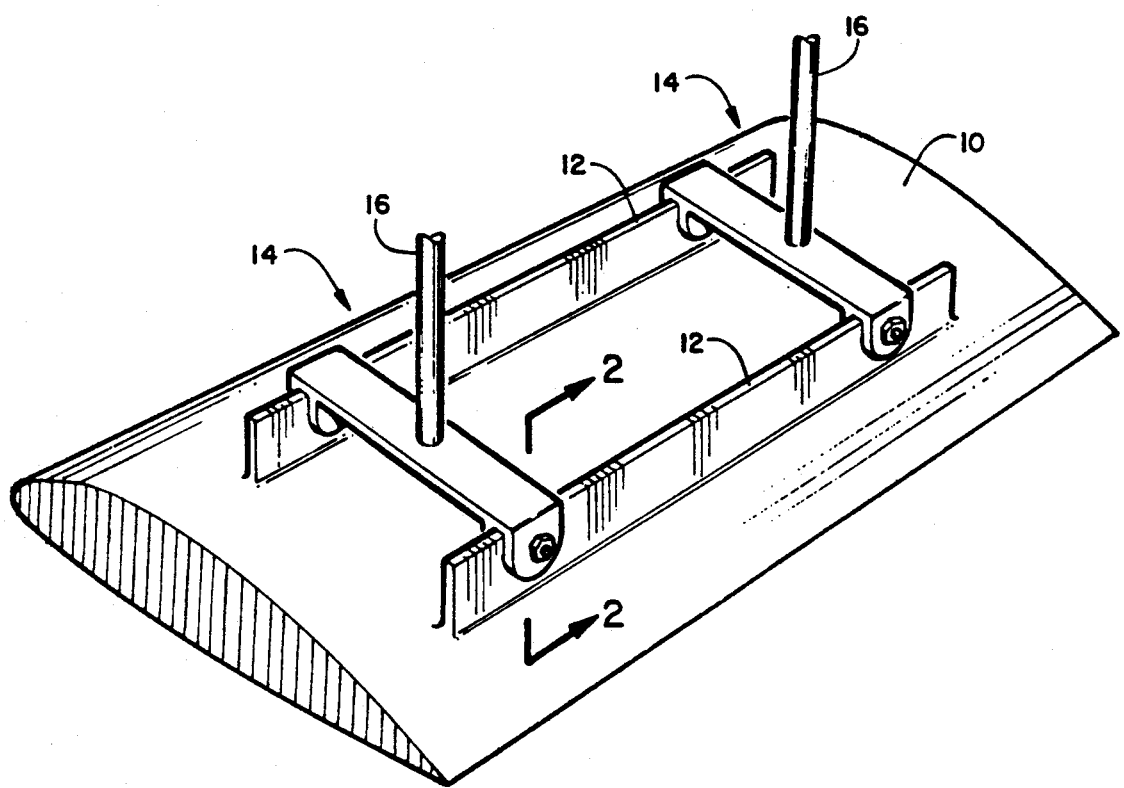
FIG. 1 is a schematic perspective view of the fittings of this invention in an exhaust flap actuator mechanism.

Referring now to FIG. 1, there is seen a schematic representation of a typical exhaust flap 10 which might be used to deflect jet engine exhaust in a hypersonic aircraft. The flap is exposed to gases moving at high velocities and very high temperatures. An optimum material for use in flap 10 is a carbon-carbon material such as that available from Rohr Industries of Chula Vista, Calif. Of course, any other suitable carbon-carbon material may be used as desired.

A pair of upstanding blade stiffeners 12 extend along flap 10. Fittings 14 connect blades 12 to rods 16 which attach to the aircraft structure (not shown) in a conventional manner to support flap 10 and to move the flap as necessary. Blades 12 are preferably made from the same material as flap 10 and may be formed integrally therewith.

Figure 2:
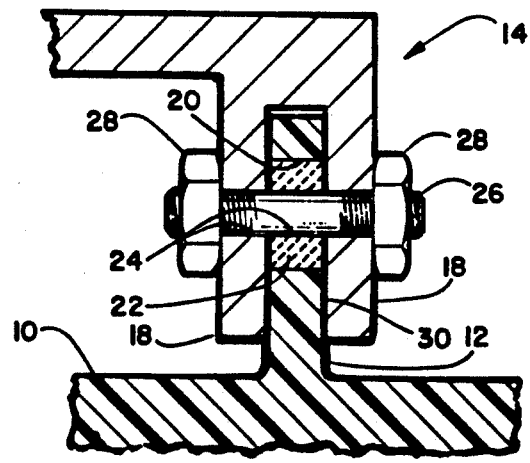
FIG. 2 is a vertical section view through the fitting, taken on line 2—2 in FIG. 1.

Details of fittings 14 are provided in the section view of FIG. 2. Fitting 14 includes a metal clevis 18 which fits tightly over blade 12. A hole 20 through blade 12 is filled with a ceramic bushing 22 which is flush with the vertical surfaces of blade 12. A bolt hole 24 extends through clevis 18 and bushing 24 to receive a bolt 26. In the embodiment shown, bolt 26 is a continuously threaded, headless, bolt. A pair of nuts 28 are threaded onto the ends of bolt 26 to the extent that clevis 18 is tightly clamped against bushing 22 and blade 12.

A conventional headed bolt could be used in place of headless bolt 26, if desired, with a single nut on the opposite end.

As mentioned above, clevis 18 and the set of bolt 26 and nuts 28 could be formed from any suitable alloys, so long as the CTE of the bolt and nuts is lower than that of clevis 12, so that as temperatures increase the greater expansion of the clevis will maintain and even increase the clamping forces on blade 12. Typically, clevis may be formed from "Inconel 718" a nickel alloy available from Huntington Alloys with the bolt and nuts formed from "WC-103" a niobium alloy available from Teledyne Wah Chang.

For optimum results at high temperatures, bolt 26 and nuts 28 should have a silicide coating to prevent surface oxidation. Clevis 18 and the remainder of fitting 14 could also have protective surface coatings, if desired.

The carbon-carbon structure may be formed from any suitable material. Typically, the carbon-carbon material may be formed from T-300 carbon fabric (available from Amoco) in a phenolic matrix, heated to about 2150° C. to carbonize the matrix. Various fillers may be added and densification techniques used to obtain desired characteristics. A thin glaze of borosilicate glass a CVD-applied SiC coating or the like may be applied to the surface to inhibit oxidation.

In order to reduce Hertzian stresses where the clevises touch the carbon-carbon surface from vibration and temperature cycling, a layer of compliant high temperature fabric such as "Nextel 310" from 3-M Corp. preferred between clevis 18 and blade 12.

While certain specific dimensions, materials and arrangements were described in conjunction with the above description of preferred embodiments, those may be varied, where suitable, with similar results. For example, a suitable washer could be used between nut(s) 28 and clevis 18, if desired.

I claim:

1. A self-tightening fitting for attaching metal structures to carbon-carbon structures which are to be exposed to elevated temperatures which comprises:
    a carbon-carbon blade extending from a carbon-carbon structure;
    a metal clevis extending from a metal structure, said clevis snugly fitting over said blade;
    a ceramic bushing fitted in a transverse opening through said blade;
    a bolt extending through a transverse hole through said clevis and said ceramic bushing; and
    at least one nut on said bolt which, when tightened, tightly presses said clevis and bushing together;
    said clevis having a higher coefficient of thermal expansion than said bolt and nut.

2. The fitting according to claim 1 wherein said bolt has a head on one end and a nut on the other, said head and nut bearing against said clevis.

3. The fitting according to claim 1 wherein said bolt is headless and has a nut on each end, each bearing against said clevis.

4. The fitting according to claim 1 wherein said clevis is formed from a metal alloy selected from ferrous, nickel or cobalt based alloys and said bolt and nut are formed from an alloy, comprising niobium, tantalum or other suitable low expansion refractory metal.

5. The fitting according to claim 1 wherein said bolt and nut are formed from an alloy comprising niobium, tantalum or mixtures thereof.

6. The fitting according to claim 1 further including a layer of high temperature resistant compliant fabric between said blade and said clevis.

* * * * *